June 5, 1951
T. L. B. WEBB
2,556,128
METHOD FOR REMOVING SCALE
Filed Aug. 17, 1945
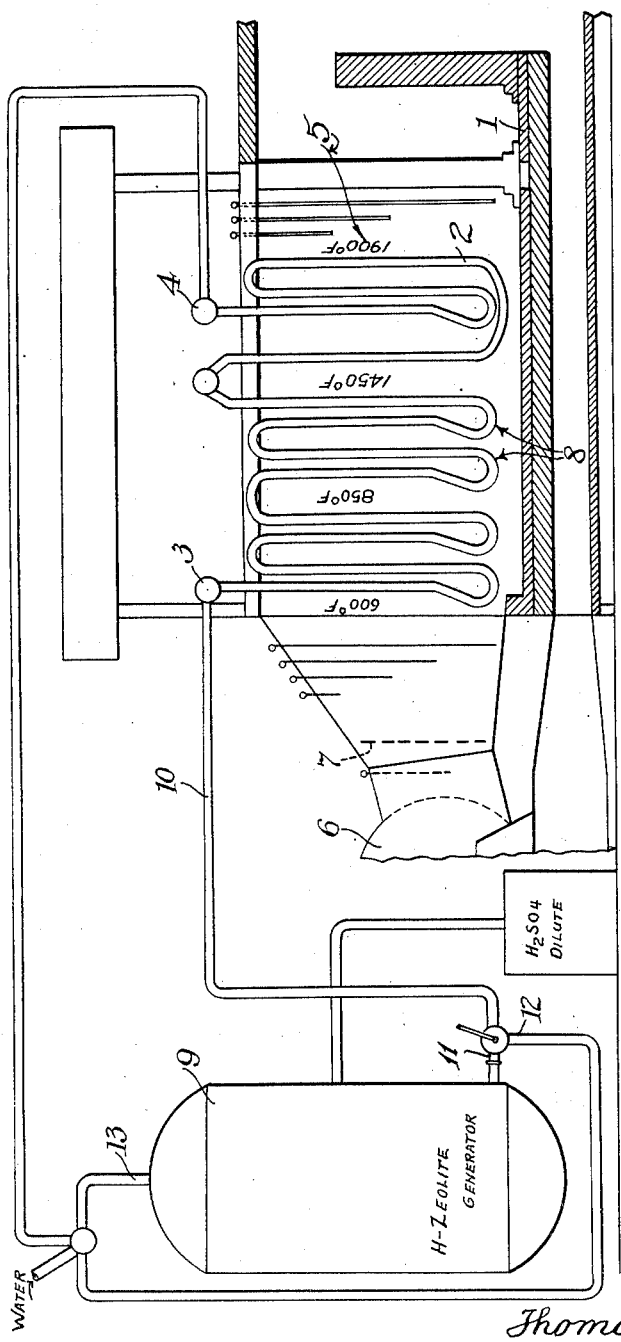
Inventor
Thomas L. B. Webb
By Lyon & Lyon
Attorneys Patented June 5, 1951

2,556,128

UNITED STATES PATENT OFFICE 2,556,128

METHOD FOR REMOVING SCALE

Thomas L. B. Webb, Los Angeles, Calif.

Application August 17, 1945, Serial No. 611,131

5 Claims. (Cl. 134—22)

This invention relates to a method for removing water scale, or the deposits from water in water handling equipment. I have discovered that hydrogen zeolite water may be effectively employed for removing deposits made in water handling equipment and which form scale or coatings therein.

I have further discovered that such hydrogen zeolite treatment of such equipment or apparatus can be effected without danger of the said treated water attacking the equipment.

In the utilization of water tube boilers, steam superheaters, water heaters, heat exchangers, pressure vessels, and other similar equipment handling water, it is common for such equipment to become scaled or coated with chemical deposits from the water. Such chemical deposits usually include carbonates of sodium, calcium, magnesium, and the like. When the equipment becomes scaled, the heat exchange efficiency of such equipment is greatly reduced substantially in proportion with the amount of scale deposited in the equipment. As the scale builds up to where the heat exchange from the exterior of the equipment to the water within the equipment is materially reduced, it is very possible for the equipment to burn out.

It is therefore an object of this invention to provide a method of removing scale deposited by water from within water handling equipment such as superheaters, boilers, heat exchangers, vessels and the like, which includes the treatment of the scale surface of such equipment with hydrogen zeolite water.

Another object of this invention is to provide a method for the removal of such scale deposits as sodium, calcium and magnesium carbonates and other scale deposits from the surfaces upon which they are deposited by the treatment of the said surfaces with hydrogen zeolite water whereby the hydrogen ions of the hydrogen zeolite water act to replace the sodium, calcium and magnesium ions of the scale.

Another object of this invention is to provide a method for the removal of scale from water carrying equipment which includes the steps of treating the scale with hydrogen zeolite water, determining the pH of the hydrogen zeolite water, and continuing the treatment until the pH remains substantially constant and then washing the equipment.

Other objects and advantages of this invention it is believed will be apparent from the following detailed description of a preferred embodiment thereof as illustrated in the accompanying drawing, The drawings constitute a diagrammatic illustration of the apparatus used in carrying out my process and embodying my invention.

In accordance with the preferred embodiment of my invention the method as it is herein illustrated is shown and explained in conjunction with the removal of water deposited scale or coating from within the coils of a steam superheater, although my invention is in no way limited in its applicability to the treatment of such scaled tubing.

In this embodiment of my invention the superheater as shown for the purpose of illustration includes a fire box 1 which may constitute the frame work of a furnace or may be of any other suitable or desirable construction.

Supported within this frame work is a series coil 2 in which water or steam which it is desired to superheat is circulated from an inlet 3 to an outlet 4. In this modification the superheating is carried out by means of heated gases which flow over the tubes through the fire box in the direction substantially as indicated by the arrows 5. The gases are drawn away from the tubes usually by means of a fan 6 and may be discharged at any suitable point. The rate of withdrawal of these gases may be controlled by means of a damper 7 and of course by speed of operation of the fan 6.

In the use of such a superheater there is a tendency of the scale to accumulate in the lower bends 8 due somewhat to the contractions and expansion of the tube sections above the bends 8 which results in loosening of the scale at the points above the bends 8 and permitting the same to fall to the lowermost bends. It has proven particularly difficult to remove the scale from tubes of this character and ordinary methods have been found inadequate. The most practical method heretofore followed has been to dissolve the scale by circulating ordinary water through the coils for a long period of time sufficient to enable the materials of the scale to be dissolved in the water. This requires the handling of extremely large quantities of water and a long period of time because the solubility of the materials making up the scale is very low in ordinary water. It has been found impractical to try to utilize acid methods of treatment in the removal of the scale from such scale encrusted tubes because of the fact that such treatments result in the acid so attacking the tubes as to very materially shorten their lives, not only during the treatment, but after the treatment has discontinued due to the accumulation of the acid within the bends 8.

It is impractical to try to vaporize the water containing the acid in the bends 8 because the addition of heat to the coils containing the acid results in very rapid chemical reaction between the acid and the iron or steel making up the coils with their subsequent failure.

In carrying out my invention I employ an ordinary commercial form of hydrogen zeolite generating apparatus diagrammatically illustrated at 9. The generator 9 is a steel tank having a protective lining (not shown) and containing a commercially available acid-resistant zeolite. The generator operates on the principle of ion-exchange. The mineral salts present in the raw water supply are practically completely disassociated into ions. The principal ions present are the cations of calcium, magnesium and sodium and the anions of bicarbonate, sulphate and chloride. Raw water is passed through inlet 13 into the generator 9 and downwardly through the bed of zeolite (not shown). As the water flows down through the unit the zeolite granules take out the cations of calcium, magnesium and sodium and give up hydrogen ions in exchange to form acids. The carbonic acid formed from the bicarbonates breaks down immediately into carbon dioxide and water. Sulphuric and hydrochloric acids are formed from the sulphate and chloride ions. The water so treated is circulated as described below. The generating unit 9 is connected through a suitable flexible connection with the inlet 3 of the coil. The outlet 4 of the coil may be connected with any suitable waste or other point of disposal of the water, or may be connected to the inlet 13 of the unit 9 as shown in the drawings. Connected in the flexible conduit 10 is a three-way valve, the branch 11 of which is connected with the outlet branch of the hydrogen zeolite unit 9 and the inlet branch 12 of which is connected with an ordinary source of water. In this manner the hydrogen zeolite water from the treating unit 9 may be circulated through the coil 2 until all of the scale within the coil has been removed. This removal of the scale is by hydrogen ion replacement of the sodium, calcium and magnesium ions which usually are combined with carbon dioxide, sulphate, chloride, or similar radicals, to form the substantially insoluble precipitate of which the scale is composed. The hydrogen ion replacement results in the formation of the acids with either the carbon dioxide, sulphate, chloride, or other radicals, which then pass into the solution. The sodium, calcium and magnesium also pass into solution with a reduction of the hydrogen ion concentration, and these base radicals become embedded upon the zeolite in the hydrogen zeolite generating unit when the outlet 4 of the coil is connected to the inlet 13 of the hydrogen zeolite unit. This process of circulating the hydrogen zeolite water through the zeolite in the unit 9 is continued until analysis of the return water shows substantial constancy of the pH value thereof, indicating that the water upon continued circulation is not dissolving or removing further scale from the coil 2. This indicates that the scale has been substantially completely removed.

This reaction not only removes the sodium, calcium and magnesium deposits, but also results in the removal of the silica deposits which may make up a considerable portion of the scale.

As an example of the foregoing, in a superheater similar to that shown in the accompanying drawing, hydrogen zeolite water was circulated through the inlet 3 having an initial pH of 4.4 and the first hydrogen zeolite water passed out of the outlet 4 showed a pick-up of 17,000 parts per million of solids with a resulting pH of 10.7. The circulation was continued for a period of approximately 60 hours, when it was observed that the pH of the water leaving the outlet 4 was 4.4, indicating no further action. The inflow of hydrogen zeolite water was stopped.

A three-way valve in the flexible conduit 10 is rotated to a position to admit ordinary supply water into the inlet 3 to wash out the hydrogen zeolite water. The water flow was then stopped and the coils were blown out with air. The superheater was then returned to service.

Before this operation of removing the scale was performed, it was determined that there was a scale of approximately $\frac{1}{16}$ inch thickness upon the inner surface of the coil 2.

This superheater in service before the washing operation showed an excess in temperature of about 35° F. in the tubes due to the overheating of these tubes because of the insulating effect of the scale within the interior of the tubes. Upon completion of the descaling operation, the excess temperatures were entirely eliminated and it was found that the operating tube temperatures were on an average lower than when the unit was first placed in service, indicating not only the removal of the scale deposited by the water, but also indicating the removal of some of the mill scale which undoubtedly existed in the tubes upon their original installation.

After continued recirculation of the water from such a descaling operation into the hydrogen zeolite unit, it is necessary, to regenerate the hydrogen zeolite unit by the use of a quantity of the acid (sulphuric $H_2SO_4$) as is well understood in the art so that the unit may again be placed in operation. Dilute sulphuric acid is passed through the bed of zeolites to remove therefrom the ions absorbed from the water. The bed is then washed with water to remove excess acid and is then ready for a resumption of the cycle.

Having fully described my invention, it is to be understood that I do not wish to be limited to the details herein set forth, but my invention is of the full scope of the appended claims.

I claim:

1. The method of removing water deposited scale from the surface of a water container which includes the steps of removing the scale from the surface by passing hydrogen zeolite water over the surface, the water having an acid pH and continuing the treatment until the pH of the water after passing over the surface remains substantially constant and until the pH of the water after passing over the surface becomes substantially equal to the pH of the hydrogen zeolite water before it is passed over the surface of the container.

2. The method of cleaning a water container of water deposited scale which includes the steps of passing hydrogen zeolite water having an acid pH through the water container until the pH of the inlet water and pH of the outlet water of the system are substantially the same.

3. The method of removing water deposited scale from the coils of a superheater which includes the steps of circulating hydrogen zeolite water having an acid pH through the coils, determining the initial pH of the hydrogen zeolite water, and continuing the circulation until the pH of the water at the discharge from the coils is substantially equal to the pH of the water at the inlet of said coil.

4. The method of removing water deposited scale from the coils of a superheater which includes the steps of circulating hydrogen zeolite water having an acid pH through the coils, the hydrogen zeolite water being of initially determined acid pH, and continuing the circulation until the water at the discharge from the coils is substantially the same as the pH of the water at the inlet of said coil, and then washing out the coils.

5. The method of removing water deposited scale from the heating coils of a superheater which includes the steps of circulating hydrogen zeolite water through the coils until the hydrogen zeolite water no longer picks up scale material from the coils the acid pH of the hydrogen zeolite water entering the coils being substantially the same as the acid pH of the water leaving the coils.

THOMAS L. B. WEBB.

REFERENCES CITED

The following references are of record in the file of this patent:

UNITED STATES PATENTS

| Number | Name | Date |
|---|---|---|
| 2,089,317 | Wilder | Aug. 10, 1937 |
| 2,233,852 | Schmitt | Mar. 4, 1941 |
| 2,294,765 | Urbain | Sept. 1, 1942 |
| 2,295,204 | Dockray | Sept. 8, 1942 |
| 2,325,675 | Gustafson | Aug. 3, 1943 |